(12) United States Patent
Schmidt et al.

(10) Patent No.: US 8,930,507 B2
(45) Date of Patent: Jan. 6, 2015

(54) PHYSICAL MEMORY SHARED AMONG LOGICAL PARTITIONS IN A VLAN

(75) Inventors: Donald W. Schmidt, Stone Ridge, NY (US); Jerry W. Stevens, Raleigh, NC (US); Martin Taubert, Gaertringen (DE); Alexandra Winter, Schwieberdingen (DE)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 13/494,800

(22) Filed: Jun. 12, 2012

(65) Prior Publication Data

US 2013/0332696 A1 Dec. 12, 2013

(51) Int. Cl.
*G06F 12/00* (2006.01)

(52) U.S. Cl.
USPC .............................. 709/220; 709/223; 711/153

(58) Field of Classification Search
CPC .............. G06F 9/5077; G06F 11/0712; G06F 11/2046; G06F 11/1425; G06F 2201/815; G06F 9/45558
USPC .................................... 711/153; 709/220, 223
See application file for complete search history.

(56) References Cited

U.S. PATENT DOCUMENTS

| | | | |
|---|---|---|---|
| 5,701,413 A | 12/1997 | Zulian et al. | |
| 6,721,806 B2 | 4/2004 | Boyd et al. | |
| 7,114,096 B2 | 9/2006 | Freimuth et al. | |
| 7,551,614 B2 | 6/2009 | Teisber et al. | |
| 7,580,415 B2 | 8/2009 | Hudson et al. | |
| 7,971,236 B1 | 6/2011 | Lentini | |
| 8,473,692 B2 * | 6/2013 | Rosales et al. | 711/153 |
| 8,627,136 B2 | 1/2014 | Shankar et al. | |
| 2003/0037178 A1 | 2/2003 | Vessey et al. | |
| 2004/0049774 A1 | 3/2004 | Boyd et al. | |
| 2006/0129676 A1 | 6/2006 | Modi et al. | |
| 2006/0168274 A1 | 7/2006 | Aloni et al. | |
| 2007/0028138 A1 | 2/2007 | Noya et al. | |
| 2007/0060366 A1 | 3/2007 | Morrow et al. | |
| 2008/0034418 A1 | 2/2008 | Venkatraman | |
| 2010/0217916 A1 | 8/2010 | Gao et al. | |

(Continued)

FOREIGN PATENT DOCUMENTS

WO WO0036509 A2 6/2000

OTHER PUBLICATIONS

Kisskimis, Gus; Update of Optimized Communications within zEnterprise; ze-Business Leaders Council; Lisbon, Portugal; May 23-27, 2011.

(Continued)

*Primary Examiner* — Hong Kim
(74) *Attorney, Agent, or Firm* — Parashos Kalaitzis; Robert C. Rolnik

(57) ABSTRACT

A computer implemented method for sharing physical memory among logical partitions. A computer reserves physical memory of a Central Electronic Complex (CEC) for communication within the CEC as a shared memory pool. The computer creates a first logical partition using resources of the CEC that are not reserved as the shared memory pool. The computer creates a second logical partition using resources of the CEC that are not reserved as the shared memory pool. The computer creates a virtual local area network (VLAN) having at least two addresses within the CEC. The computer allocates a portion of the shared memory to the VLAN as the shared memory pool.

25 Claims, 5 Drawing Sheets

(56) References Cited

U.S. PATENT DOCUMENTS

2012/0198188 A1* 8/2012 Coronado et al. ............ 711/162
2013/0031341 A1* 1/2013 Ganti et al. ....................... 713/2
2013/0332677 A1* 12/2013 Fitzpatrick et al. ........... 711/147

OTHER PUBLICATIONS

Schell, Joseph, Office Action U.S. Appl. No. 13/494,831, Mar. 27, 2014.
Rolnik, Robert, Response to Office Action U.S. Appl. No. 13/494,831, Apr. 4, 2014.

* cited by examiner

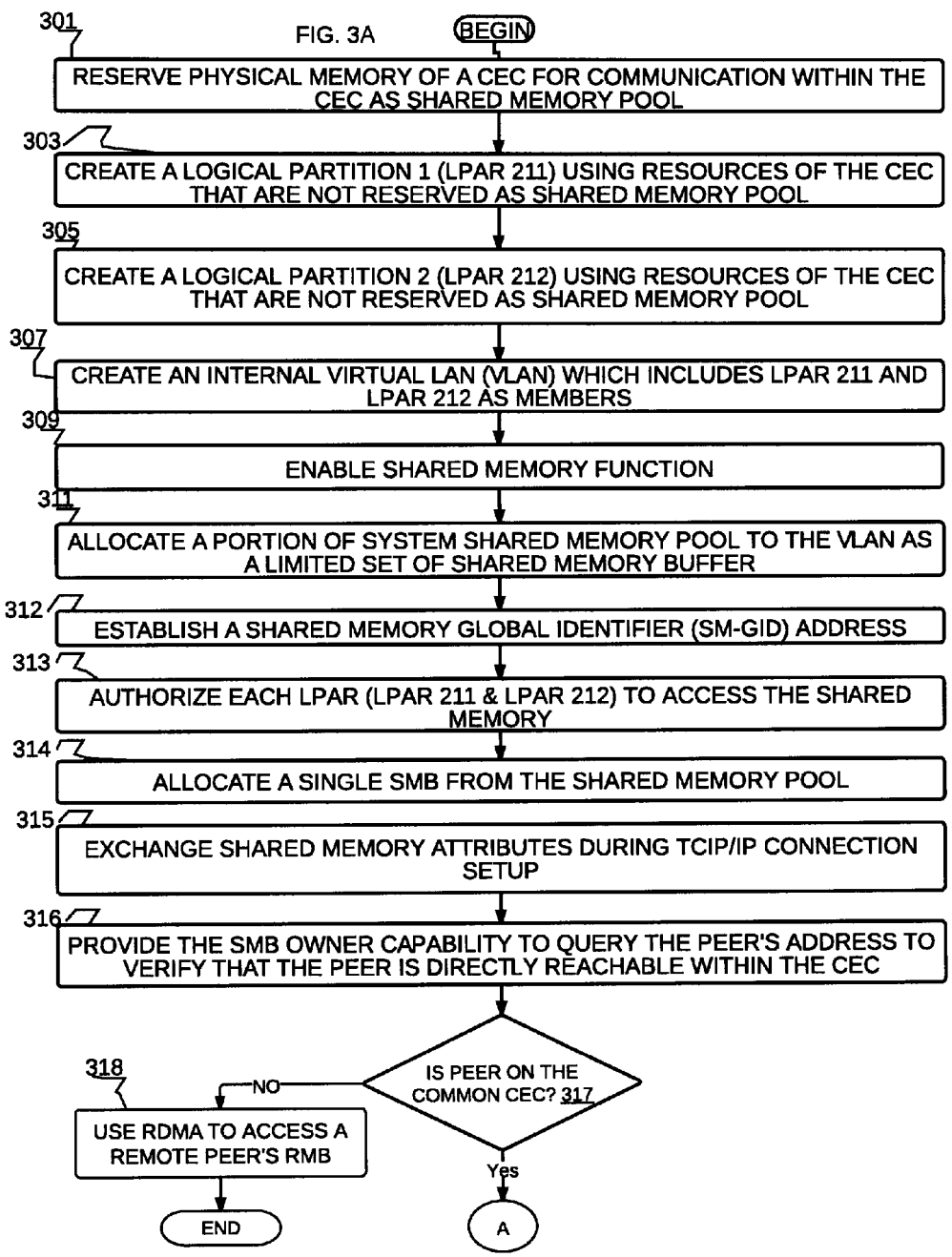

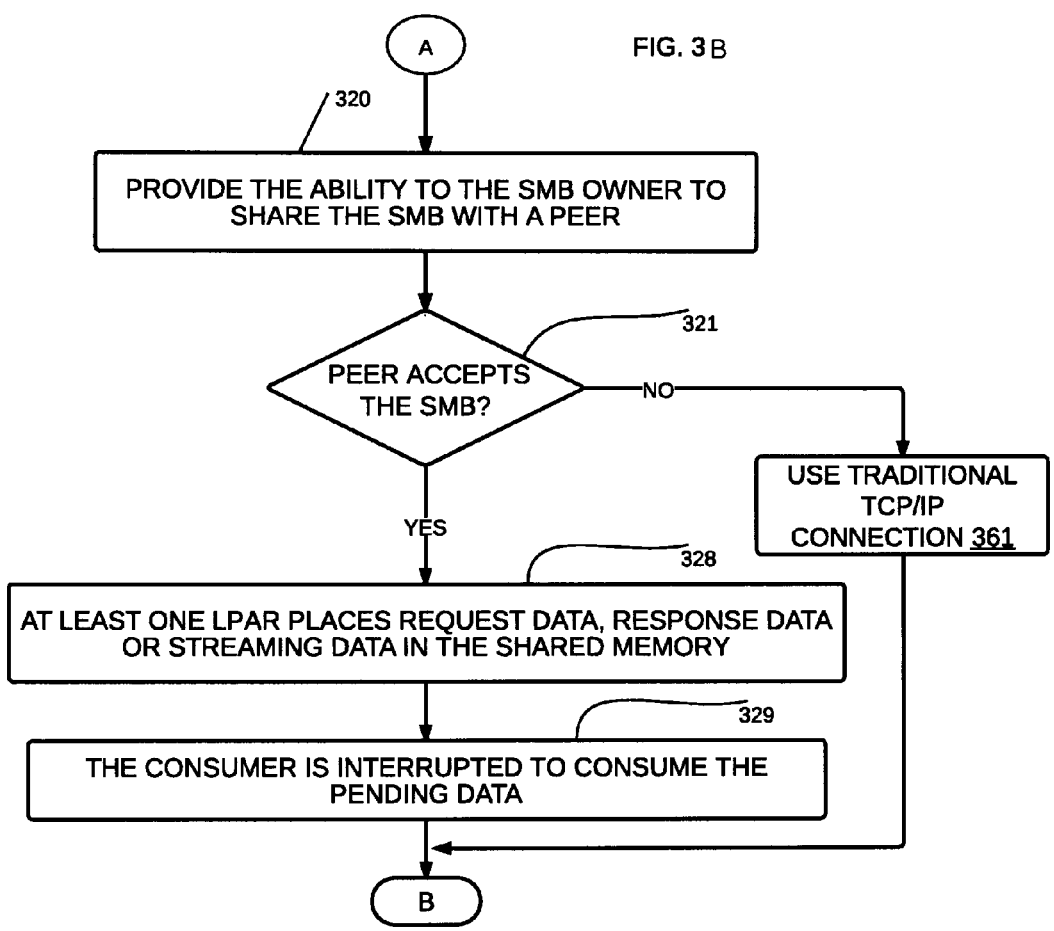

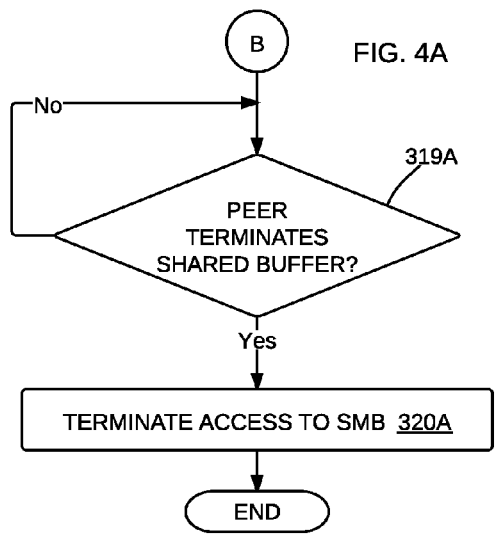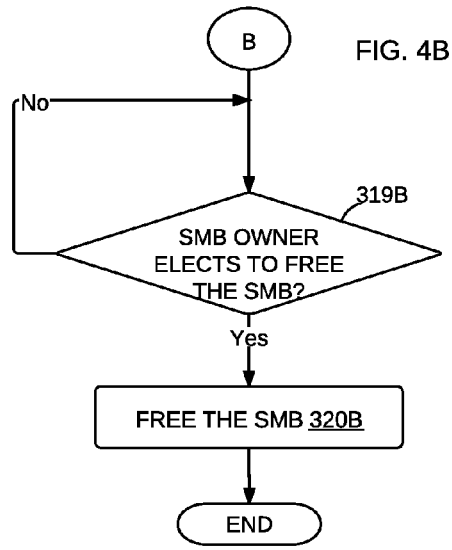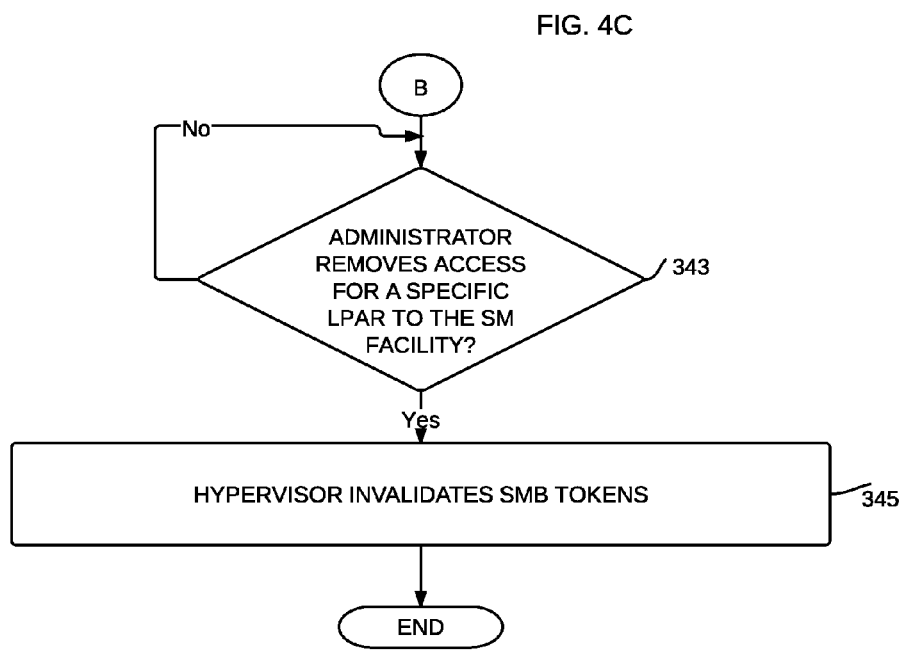

PHYSICAL MEMORY SHARED AMONG LOGICAL PARTITIONS IN A VLAN

BACKGROUND

The present invention relates generally to the field of data communication and networking, and more particularly to methods, systems, and computer program products that communicate within a Central Electronic Complex (CEC) and between CECs InfiniBand™ and RDMA over Enhanced Converged Ethernet (RoCE) provide support for Remote Direct Memory Access (RDMA) technology are existing, known technologies for high speed connectivity between hosts and servers. InfiniBand is a trademark of the InfiniBand Trade Association. These technologies are implemented in a networking environment with additional hardware and corresponding software, including drivers and application programming interfaces. This means that using these high-speed technologies requires server programs, applications, and clients to code to specific low level APIs to exploit them. For example, instead of sockets, User Direct Access Programming Library (UDAPL) would be used to communicate using InfiniBand.

There is an existing base of hardware vendors that provide RDMA capable Network Interface Cards or Adapters (RNICs) that allow the software device driver or upper layer protocol to directly exploit the adapter hardware using low layer (IB) verbs via the platform's PCIe architecture. The verb interfaces are based on Queue Pair technology. RDMA capable network switches are also required. There also exist a base of switch vendors that provide RDMA capable switches for both IB or RoCE network fabrics. Collectively the (PCIe based) adapters, switches and the host based verb interfaces all provide the ability for each host to exploit RDMA solutions. The RDMA technology in conjunction with the IB (or RoCE) wire protocol allows each host to register memory with the adapter and then directly write or read into the remote's host memory. This (remote) direct access to a peer host's memory (via low level verbs) along with a high level communications protocol together provide for a very efficient means of communications among remote hosts that are clustered together attached to the same RDMA capable network fabric.

There is also an existing and growing set of hypervisor based solutions that provide the ability to create virtual server images on the same physical compute platform. In many cases the hypervisor can support hundreds of active virtual servers. The problem then becomes how the hypervisors can efficiently virtualize the RDMA capabilities for the virtual servers on the same platform. The existing solution allows the hypervisor to exploit the virtualization provided by the RNIC adapter vendor (referred to as Single Root-I/O Virtualization or SR-IOV). The adapter virtualization requires that the hypervisor use the hardware adapter and the PCIe interface for connectivity within a single platform. This solution can become costly and induce bottlenecks within the platform.

SUMMARY

According to one embodiment of the present invention, a method, computer program product and data processing system are shown for sharing physical memory among logical partitions. A computer reserves physical memory of a Central Electronic Complex (CEC) for communication within the CEC as a shared memory pool. The computer creates a first logical partition using resources of the CEC that are not reserved as the shared memory pool. The computer creates a second logical partition using resources of the CEC that are not reserved as the shared memory pool. The computer creates a virtual local area network (VLAN) having at least two addresses within the CEC. The computer allocates a portion of the shared memory to the VLAN as the shared memory pool.

BRIEF DESCRIPTION OF THE SEVERAL VIEWS OF THE DRAWINGS

FIG. 3 is a flowchart of steps performed by a hypervisor to initially setup the shared memory buffer in accordance with an illustrative embodiment of the invention;

FIG. 4A is one alternative way to terminate a shared memory buffer (SMB) in accordance with an illustrative embodiment of the invention;

FIG. 4B is another way to terminate an SMB in accordance with an illustrative embodiment of the invention; and FIG. 4C is still another way to terminate an SMB in accordance with an illustrative embodiment of the invention.

DETAILED DESCRIPTION

Figure 1:
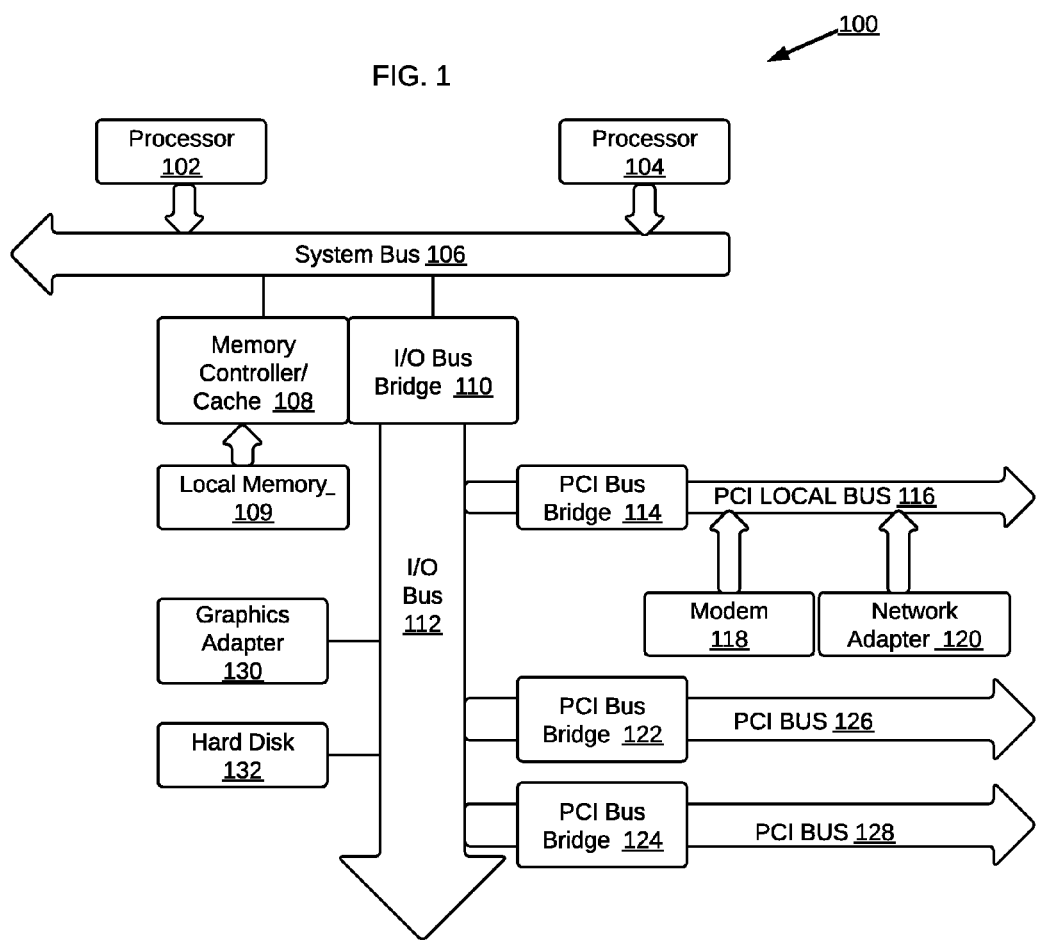
FIG. 1 is a block diagram of a data processing system in accordance with an illustrative embodiment of the invention.

FIG. 1 is a block diagram of a data processing system in accordance with an illustrative embodiment of the invention. Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems may be connected to PCI local bus 116. Typical PCI bus implementations will support four PCI expansion slots or add-in connectors. Communication links to networks may be provided through modem 118 or network adapter 120 connected to PCI local bus 116 through add-in boards. Additional PCI bus bridges 122 and 124 provide interfaces for additional PCI local buses 126 and 128, respectively, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 1 may be, for example, an IBM® System z® server running z/OS or Linux™, or an IBM P Server running the Advanced Interactive Executive (AIX™) operating system or Linux. AIX, P Server, and System z are trademarks or registered trademarks of International Business Machines Corporation. Linux is a trademark of Linus Torvalds.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

Some illustrative embodiments provide a path for high performance communications between logical partitions residing in a common central electronic complex (CEC). For logical partitions (LPARs) that communicate within the CEC, memory may be dedicated for use in a local direct memory access (DMA) configuration. As such, the memory, so dedicated, can be partitioned away from the existing physical memory. New software communication protocols, such as shared memory communications protocol, are defined to exploit this new form physical memory. Such protocols use this physical memory arranged as a shared memory pool. Efficiencies between LPARS can thus be comparable to program-to-program call architecture performed within an LPAR or within a single operating system image, at least by some illustrative embodiments. The shared physical memory solution provides the ability to directly store into the peer's memory without requiring the RDMA semantics or low layer verbs. Given that the virtual servers have direct access to the same physical memory and there is no real physical wire separating the virtual servers the queue pair (QP) operations, low level verb processing and any interactions with a hardware adapter can be omitted. The shared physical memory solution allows the same upper layer protocol to run by directly referencing the shared physical memory.

Figure 2:
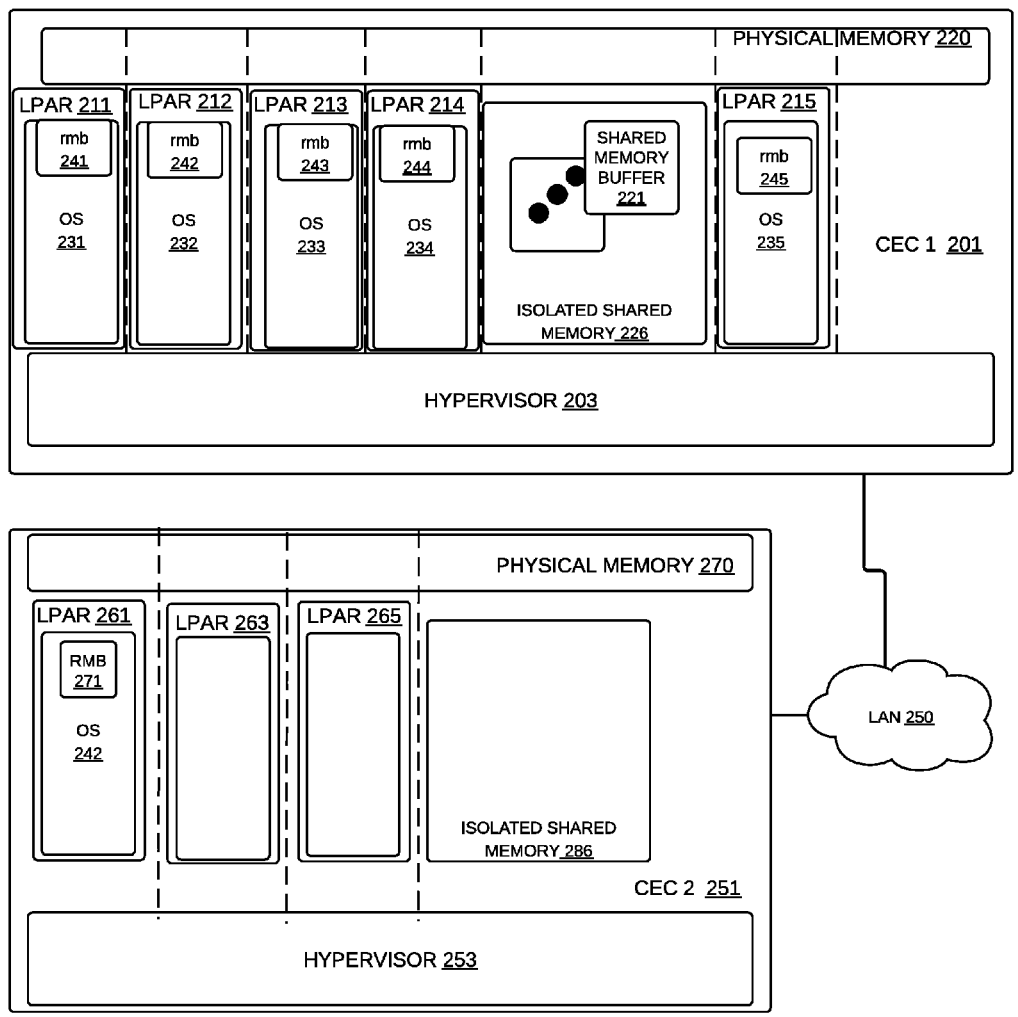
FIG. 2 is a block diagram of a logical arrangement of logical partitions within one or more Central Electronic Complexes (CEC) in accordance with an illustrative embodiment of the invention.

FIG. 2 is a block diagram of a logical arrangement of logical partitions within one or more Central Electronic Complexes (CEC) in accordance with an illustrative embodiment of the invention. A CEC is a data processing system that provides a common system bus, for example, in the manner of data processing system 100 and system bus 106 of FIG. 1. FIG. 2 depicts a logical arrangement of logical partitions within one or CECs where a hypervisor allocates resources such as memory to one or more logical partitions or LPARs. A hypervisor is a software component of a host data processing system, for example, data processing system 100 of FIG. 1 that permits multiple logical partitions to be executed using the resources of the host data processing system. The logical partitions may each use an instance of an operating system, which may be different from one logical partition to the next. A logical partition, or LPAR, is an isolated collection of data processing system resources. The data processing system resources may be physical resources and/or virtual resources. Real or physical memory is not shared by the operating system's instances (LPARs). The LPAR executes upon virtual resources that have been abstracted from physical resources by the hypervisor. The LPAR can include software components, such as, for example, an operating system image. An operating system image is the computer instructions stored as files that describe how to convert a general purpose computer or the specific resources of a logical partition to low level and utility access of such resources by a user or the applications operated by the user. At a high level, these computer instructions, when coupled to such computer or LPAR, can permit authentication, authorization, storage access, memory access, processor and thread access, access to peripherals and I/O, and other functions that permit applications to perform work useful to users and/or additional applications.

Accordingly, hypervisor 203 may configure and maintain the resource allocations in CEC 1 201. For example, hypervisor 203, under the control of an administrator, may allocate shared memory or physical memory 220 among the plural logical partitions 211, 212, 213, 214 and 215. LPARs that host an operating system image may be called operating system 231, 232, 233, 234 and 235. Accordingly, during the use of LPARs 211-215 for productive work, the LPARs may be referred to as operating systems 231-235, and are synonymous for as long as an operating system is loaded into the resources and invoked by a boot-up process of the corresponding LPAR. The allocated shared memory is physical memory. Physical memory is low-latency memory that returns contents within a few processor clock cycles. Physical memory can be, for example, local memory 109 comprising dynamic random access memory (DRAM). Physical memory is distinguishable from virtual memory which, in contrast, may be stored in a block device, offsite, or in some other high-latency storage arrangement. Physical memory is tangible, whereas virtual memory is an abstraction of memory and storage that can extend the apparent size of physical memory with some performance tradeoffs. Physical memory can be virtualized by the operating system. In other words, the hypervisor is not involved with physical memory virtualization. Each LPAR may take its allotment of shared memory and further specifically allocate it to form a remote memory buffer (RMB), explained further, below. RMBs 241-245 are allocated to each of LPARs 211-215, respectively. Similarly, RMB 271 is allocated to LPAR 261.

In the process of configuring CEC 1 201 for operation, hypervisor 203 can segregate isolated shared memory 226 for use solely in communicating between LPARs of the CEC, as well as to LPARs in neighboring CECs, as will be explained below. In other words, a shared memory buffer can be described by a data structure that identifies the portion of physical memory reserved as a shared memory buffer, whether such memory is enabled, and the identity of the LPARs authorized to access the shared memory buffer. Shared memory buffer 221 can be one of several shared memory buffers created to facilitate communications between two logical partitions. The enablement and initial setup of shared memory buffers is described in one or more of patent application Ser. No. 13/246,028 titled "Using Transmission Control Protocol/Internet Protocol (TCP/IP) To Setup High Speed Out Of Band Data Communication Connections", and AUS920120021US1 titled, "Redundancy In Shared Memory Communications", which are herein incorporated by reference.

CEC 1 201 connects to CEC 2 251 via LAN 250. CEC 2 251 may rely on an additional hypervisor, namely hypervisor 253. As such, hypervisor 253 can similarly arrange LPARs 261, 263 and 265 to each be allocated portions of physical memory 270.

The creation and destruction of LPARs is at the control of an administrator, who directly or indirectly presents credentials that authenticate the administrator as authorized to perform administrative functions. Administrative functions include, but are not limited to, the operation of commands as a 'super-user' within UNIX and similarly styled operating systems. It is appreciated that administrative authority can be divided among multiple administrators with each having distinct or overlapping levels of authority to configure a CEC.

A shared memory pool is memory shared among one or more LPARs in a CEC, and may include memory that is not allocated. In other words, the shared memory is segregated from the system physical memory 220 and 270 for special purposes. Physical memory such as isolated shared memory 226 and 286 are examples of shared memory pools.

Communication functions between LPARs of a common CEC, as well as between LPARs hosted on different CECs, can occur via shared memory software components that emulate the operation of a network interface card (NIC), but exclude some of the overhead functions of a conventional NIC. The communication function can be in shared memory buffer 221, and is further described in patent application titled "Using Transmission Control Protocol/Internet Protocol (TCP/IP) To Setup High Speed Out Of Band Data Communication Connections", (U.S. patent application Ser. No. 13/246,028) titled, "Redundancy In Shared Memory Communications", (U.S. patent application Ser. No. 13/494,831), titled "Shared Physical Memory Protocol" (U.S. patent application Ser. No. 13/494,837) which are herein incorporated by reference.

FIG. 3 is a flowchart of steps performed by a hypervisor to initially setup the shared memory buffer in accordance with an illustrative embodiment of the invention. Initially, a hypervisor reserves physical memory of a CEC for communication within the CEC as a shared memory pool (step 301). The shared memory pool can be a sub-part of, for example, physical memory 220 of FIG. 2. Initially, the shared physical memory is isolated from all LPARs. Next, the hypervisor may create an LPAR 211 using resources of the CEC that are not reserved as a shared memory pool (Step 303). Next, the hypervisor may create an LPAR 212 using resources of the CEC that are not reserved as a shared memory pool (step 305). Individual LPARs are created with (or have access to) a dedicated and specified amount of physical memory that is not shared and is physically isolated from the physical memory used by other LPARs. Accordingly, each LPAR includes at least an isolated zone of physical memory.

The hypervisor is operated by an administrator to subdivide at least two logical partitions from the CEC. Such logical partitions operate as isolated machines, which have many side-benefits, including isolating physical memory and other resources from the malicious effects of apocryphal code found in another logical partition. Nevertheless, the operating systems within logical partitions can coordinate functions by communicating with each other. A logical partition includes the physical resources allocated to it, as well as software components included as part of an operating system. Furthermore, the logical partition can include environmental settings and system tunables that are set according to the needs of the system administrator.

Next, the hypervisor may create an internal virtual LAN (VLAN) which includes at least LPAR 211 and LPAR 212 as members (step 307).

As part of setting up or creating each LPAR, the hypervisor may establish an address called a Shared Memory Global Identifier (SM-GID) (step 312). The SM_GID can be established in response to the OS connecting to the internal VLAN by which communications are directed. An address or SM-GID is a unique identifier of the LPAR that permits it to specifically receive data within a data processing system. An address may also be an Internet Protocol (IP) address, for example.

Next, the hypervisor may enable the shared memory function (step 309). A shared memory function is an algorithm and its coordinating data structures that both: a) allocates and enables an overall pool of memory for special purposes; and b) deallocates and disables the pool of memory. Each allocation/deallocation occurs with respect to a subset of the memory in units of shared memory buffers. Next, the hypervisor may allocate a portion of the overall system shared memory pool to the VLAN as a limited set of shared memory buffer (step 311). The shared memory buffers (SMBs) may be, for example, shared memory buffer 221 of FIG. 2. As such, the shared memory buffer may be used solely for the purpose of communicating between logical partitions. Next, the hypervisor may establish a shared memory global identifier address, or SM-GID (step 312). Furthermore, the hypervisor can authorize each LPAR, for example, LPAR 211 and LPAR 212, to access the SM pool (step 313). Shared memory pool is the memory allocated to a particular VLAN. There can be plural VLANs and therefore plural sm-pools within isolated shared memory 226.

The hypervisor provides a unique set of instructions to allow the operating systems to manage (i.e., allocate, bind and free) individual Shared Memory Buffers (SMBs) and access (i.e., read/write) the SMBs for the purpose of communicating using a shared memory communications protocol. Next, using a hypervisor based instruction the OS may allocate or create a single SMB (step 314). The SMB is allocated from the SM pool, such as isolated shared memory 226 of FIG. 2. As such, the OS becomes the owner of the SMB. An SMB owner is an OS that controls a shared memory buffer. As part of creating the ownership relationship of an OS to an SMB, the hypervisor can provide a token back to the OS. The SMB owner token is used to access the SMB.

The Shared Memory component of the operating systems can exchange shared memory attributes during TCP/IP connection setup (step 315).

Next, the hypervisor can provide the capability for the SMB owner to query the peer's (SM-GID) address to verify that the peer is directly reachable within the common CEC (step 316). A common CEC is a CEC that provides at least memory resources to the two or more software components that rely on such memory resources. A peer is directly reachable within the same CEC when both peers have access to the same physical memory. The peer's address can be a SM-GID.

Next, the hypervisor may determine whether the peer is on a common CEC (step 317). A negative outcome to step 317 can result in the LPARs using RDMA to access a remote peer's remote memory block (step 318). the LPARs using RDMA to form links (step 317). Processing may terminate thereafter.

However, a positive outcome to step 317 can result in the hypervisor providing the ability to the SMB owner to share (or bind) the SMB with a peer (step 320). The peer is an authorized peer host OS. The SMB owner can find the peer using the Shared Memory Communications protocol described in patent application Ser. No. 13/494,837 titled "Shared Physical Memory Protocol". The hypervisor may create a status bit array, or add to an existing status bit array that is allocated to the use of the SMB owner and its peer. The status bit array is memory that is allocated to either the SMB owner or the peer for notifying its counterpart that data is available. This notification can be accomplished using a signal token, explained below. In other words, among the LPARs only the SMB owner and the peer can access the status bit array. By operation of step 320, the peer can accept or reject the offer to share the SMB. Accordingly, the local LPAR may determine whether the peer accepts the SMB (step 321). If the peer does not accept the SMB, then the LPAR can use a traditional TCP/IP connection (step 361).

In response to the peer accepting the SMB, the hypervisor can provide the peer OS with a unique SMB token. A shared memory buffer (SMB) token is an authorization for access to a specific memory. The SMB token includes the identity of the operating system and the corresponding identity of the specific SMB. The peer then uses the SMB token to access the newly accepted SMB. The bind and accept process also causes the hypervisor to create a set of SMB signal tokens for each OS. A signal token is generated by the hypervisor as part of a bind process and an accept process, for correspondingly, a first operating system and a second, or accepting, operating system. The signal token contains information to find a peer to the first operating system, and further, to identify a corresponding SMB. The signal tokens are used to allow each OS to signal their peer when attention is required for a specific SMB.

In response to the peer accepting the SMB, both LPAR 211 and LPAR 212 may control the SMB. Each individual TCP connection is assigned an area within the SMB called and SMB Element (SMBE). According to communication protocols, each of LPAR 211 and LPAR 212 may exchange data in reliance on the SMB and the SMBE. Accordingly, at least one LPAR among LPAR 211 and LPAR 212 may place request data, response data or streaming data in the shared memory (step 327). Producing data or writing into the SMBE (peer's receive area) is provided by a hypervisor Shared Memory Move (SM-Move) operation. The producer will also update the SMBE control information or cursors.

The hypervisor also provides the ability for the operating systems to atomically update the SMBE control information in a serialized fashion using a atomic SM-CS-Move operation.

Once user and control data is placed into the SMB ("data is produced" by a sender) the hypervisor provides the ability for the producer to notify the consumer using the Signal Buffer operation via the SMB signal token (step 328). The hypervisor provides the ability for software to avoid the generation of the interrupt when the peer application is not ready to receive. This capability is provided through the atomicity of SM-CS-Move operation. As part of step 328, the hypervisor may also update control information using the status bit array. The status bit array is accessible to the consumer that allows the consumer to find the SMB with pending data to be consumed. In addition, as part of step 328, the hypervisor may then notify the consumer stimulated by the signal buffer operation via the signal token from the producer. A producer is the logical partition that generates data for a peer logical partition to consume. The consumer, in this case, is the peer host or logical partition. The SMB signal token may be used with a "signal buffer" or SIGB. A signal buffer can cause the peer host to be interrupted to consume the data.

The consumer is interrupted to consume or read (via SM-Move operation) the pending data (step 329). The consumer then locates the SMB via the status bit array and copies or consumes the available data to the target socket application via socket API receive processing.

Such communication functions may persist indefinitely. For convenience, the embodiments describe a LPAR as performing each of the remaining steps in FIG. 3. However, it is appreciated that the two or more LPARs authorized to access the SMB may singly or jointly conduct the following steps.

Further steps may follow after steps 361 or 329 in one of the alternative FIG. 4A, 4B or 4C.

FIG. 4A is one alternative way to terminate an SMB. The process of FIG. 4A may follow step 329 or step 361 of FIG. 3. Next, one of the peers can elect to terminate or unbind the shared buffer relationship (Step 319A). If it is determined that step 319A is positive, then the hypervisor may provide the unbind operation. As such, the hypervisor may allow one of the peers to terminate access to the SMB in an orderly and controlled process (step 320A). Processing may terminate thereafter. A negative determination at step 319A can result in repeatedly performing step 319A.

FIG. 4B is another way to terminate an SMB. The process of FIG. 4B may follow step 329 of FIG. 3. Alternatively, the SMB owner may elect to free the SMB (step 319B). Accordingly, the hypervisor will free the SMB (step 320B). Freeing the SMB, or unbinding the SMB, can invalidate the SMB tokens thereby terminating access to the SMB. Processing may terminate thereafter. A negative determination at step 319B can result in repeatedly performing step 319B.

FIG. 4C is still another way to terminate an SMB. The process of FIG. 4C may follow step 328 of FIG. 3. Next, the LPAR(s) may to detect that an administrator has removed access for a specific LPAR to the SM facility (step 343). Step 343 can be performed by resorting to interrupt-driven signals or based on some form of polling by the logical partition(s). If the LPAR detects no such disabling command, processing resumes at step 343. However, if the hypervisor detects a command to terminate access to SM, then the hypervisor invalidates the SMB tokens (step 345). Processing may terminate thereafter.

Some embodiments may form a new category of physical memory, or reserved memory, that is dedicated for local direct memory access. Such reserved memory is not accessible to the operating systems via traditional instructions. Rather, the reserved memory, of which shared physical memory is a class, may be exposed to the operating system via signal tokens. Further, embodiments may create a hypervisor-based shared memory buffer status mapping, also known as a status bit array. The embodiments may rely on buffer signaling capability to allow logical partitions to notify their respective peers when attention is required for a specific buffer. Buffer signalling is also known as interrupts.

According to some embodiments, a method for sharing physical memory among logical partitions is provided. A hypervisor reserves physical memory of a Central Electronic Complex (CEC) for communication through direct memory access operations within the CEC as a shared memory pool. The hypervisor creates a first logical partition using resources of the CEC that are not reserved as the shared memory pool and creates a second logical partition using resources of the CEC that are not reserved as the shared memory pool. The hypervisor creates a virtual local area network (VLAN) having at least two addresses within the CEC. The hypervisor allocates a portion of the shared memory to the VLAN creating a VLAN based shared memory pool. The shared physical memory is not visible or accessible to operating systems using traditional memory access operations. The hypervisor divides the shared memory pool into shared memory buffers and provides operating systems with a unique set of (token based) instructions to establish a point of presence. The token based instructions can be used to locate and address peers on the VLAN, for example, to create and query a SM-GID. The token based instructions can be used to manage ownership of the SMB, for example, to create and destroy the SMB. The token based instructions can be used to manage SMB sharing, for example, to bind, accept and unbind the SMBs to one or more operating systems. The token based instructions can be used to provide read/write access and atomic updates, for example, using the SM-Move and SM-CS-Move operations. The token based instructions are also used with SMB signaling, such as, for example, a signal buffer. A common communications protocol is defined allowing operating systems to share memory for the purpose of communicating directly (intra-CEC) through the shared physical memory infrastructure or communicating indirectly (inter-CEC) through RDMA technology.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, one or more embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer-readable storage device" does not encompass a signal propagation media such as a copper cable, optical fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system. For the purposes of this description, a computer-usable or computer readable storage device can be any tangible apparatus that can, store the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for sharing physical memory among logical partitions, the computer implemented method comprising:
   reserving physical memory of a Central Electronic Complex (CEC) for communication within the CEC as a shared memory pool;
   creating a first logical partition using resources of the CEC that are not reserved as the shared memory pool;
   creating a second logical partition using resources of the CEC that are not reserved as the shared memory pool;
   creating a virtual local area network (VLAN) having at least two addresses within the CEC; and
   allocating a portion of the shared memory to the VLAN as the shared memory pool.

2. The computer implemented method of claim 1, wherein the VLAN comprises at least the first logical partition and the second logical partition as members, wherein the first logical partition is addressed by at least one of the two addresses within the CEC.

3. The computer implemented method of claim 1, further comprising:
   authorizing the first logical partition to access the shared memory pool; and
   authorizing the second logical partition to access the shared memory pool.

4. The computer implemented method of claim 1, further comprising:
   determining that an administrator commands deallocating the shared memory pool; and
   responsive to a determination that the administrator commands deallocating the shared memory pool, deallocating the shared memory pool.

5. The computer implemented method of claim 1, wherein allocating a portion of the shared memory pool further comprises pinning memory down solely for communication between logical partitions.

6. The computer implemented method of claim 1, further comprising:
   enabling the shared memory pool.

7. The computer implemented method of claim 1, wherein the creating a virtual local area network (VLAN) having at least two addresses within the CEC is performed by the hypervisor; and wherein allocating the portion of the shared memory to the VLAN as the shared memory pool is performed by the hypervisor.

8. A computer program product for sharing physical memory among logical partitions, the computer program product comprising: a computer readable storage device having computer readable program code embodied therewith, the computer readable program code comprising:
   computer readable program code configured to reserve physical memory of a Central Electronic Complex (CEC) for communication within the CEC as a shared memory pool;
   computer readable program code configured to create a first logical partition using resources of the CEC that are not reserved as the shared memory pool;
   computer readable program code configured to create a second logical partition using resources of the CEC that are not reserved as the shared memory pool;
   computer readable program code configured to create a virtual local area network (VLAN) having at least two addresses within the CEC; and
   computer readable program code configured to allocate a portion of the shared memory to the VLAN as the shared memory pool.

9. The computer program product of claim 8, wherein the VLAN comprises at least the first logical partition and the second logical partition as members, wherein the first logical partition is addressed by at least one of the two addresses within the CEC.

10. The computer program product of claim 8, further comprising:
    computer readable program code configured to authorize the first logical partition to access the shared memory pool; and
    computer readable program code configured to authorize the second logical partition to access the shared memory pool.

11. The computer program product of claim 8, further comprising:
    computer readable program code configured to determine that an administrator commands deallocating the shared memory pool; and
    computer readable program code configured to deallocate the shared memory pool, responsive to a determination that the administrator commands deallocating the shared memory pool.

12. The computer program product of claim 8, wherein the computer readable program code configured to allocate a portion of the shared memory pool further comprises computer readable program code configured to pin memory down solely for communication between logical partitions.

13. The computer program product of claim 8, further comprising: computer readable program code configured to enable the shared memory pool.

14. The computer program product of claim 8, wherein the computer readable program code configured to create a virtual local area network (VLAN) having at least two addresses within the CEC is performed by the hypervisor; and wherein the computer readable program code configured to allocate the portion of the shared memory pool to the VLAN as the shared memory pool is performed by a hypervisor.

15. A data processing system comprising:
a bus;
a computer readable tangible storage device connected to the bus, wherein computer usable code is located in the computer readable tangible storage device;
a communication unit connected to the bus; and
a processor connected to the bus, wherein the processor executes the computer usable code for sharing physical memory among logical partitions, wherein the processor executes the computer usable code to reserve physical memory of a Central Electronic Complex (CEC) for communication within the CEC as a shared memory pool, create a first logical partition using resources of the CEC that are not reserved as the shared memory pool, create a second logical partition using resources of the CEC that are not reserved as the shared memory pool, create a virtual local area network (VLAN) having at least two addresses within the CEC; and allocate a portion of the shared memory to the VLAN as the shared memory pool.

16. The data processing system of claim 15, wherein the VLAN comprises at least the first logical partition and the second logical partition as members, wherein the first logical partition is addressed by at least one of the two addresses within the CEC.

17. The data processing system of claim 15, wherein the processor further executes computer readable program code configured to authorize the first logical partition to access the shared memory pool; and authorize the second logical partition to access the shared memory pool.

18. The data processing system of claim 15, wherein the processor further executes computer readable program code configured to determine that an administrator commands deallocating the shared memory pool; and deallocate the shared memory pool, responsive to a determination that the administrator commands deallocating the shared memory pool.

19. The data processing system of claim 15, wherein in executing the computer readable program code configured to allocate a portion of the shared memory pool the processor further executes computer readable program code configured to pin memory down solely for communication between logical partitions.

20. The data processing system of claim 15, wherein the processor further executes computer readable program code configured to enable the shared memory pool.

21. The data processing system of claim 15, wherein, in executing computer readable program code configured to create a virtual local area network (VLAN) having at least two addresses within the CEC, the processor executes computer readable program code of a hypervisor; and wherein the allocate the portion of the shared memory to the VLAN as the shared memory pool is performed by the hypervisor.

22. A computer implemented method for sharing memory among logical partitions, the computer implemented method comprising:
reserving physical memory of a Central Electronic Complex (CEC) for communication within the CEC as a shared memory pool;
creating a first logical partition using resources of the CEC that are not reserved as the shared memory pool;
creating a second logical partition using resources of the CEC that are not reserved as the shared memory pool;
segregating isolated shared memory configured for use in communicating between only the first logical partition and the second logical partition;
creating a virtual local area network (VLAN) having at least two addresses within the CEC; and
allocating a portion of the shared memory pool to the VLAN as a shared memory buffer.

23. The computer implemented method of claim 22, further comprising:
creating a status bit array and a buffer signaling capability allowing the first logical partition to notify the second logical partition in response to data availability in a shared memory buffer of the isolated shared memory.

24. The computer implemented method of claim 23, wherein the shared memory buffer is accessible only to the first logical partition and the second logical partition.

25. The computer implemented method of claim 23, further comprising reserving reserved memory dedicated for a local direct memory access, the reserved memory exposed to an operating system access via signal tokens.

\* \* \* \* \*